(12) United States Patent
West et al.

(10) Patent No.: US 6,265,843 B1
(45) Date of Patent: Jul. 24, 2001

(54) DETECTION OF SATURATION STATUS FOR NON-SYNCHRONOUS INCREMENTAL ACTUATORS USING A VARIABLE POSITION ESTIMATE WINDOW

(75) Inventors: Jonathan D. West, Brown Deer; Brian T. Estill, Milwaukee; Jiade Chen, Menomonee Falls, all of WI (US)

(73) Assignee: Johnson Controls Technology Co., Plymouth, MI (US)

( * ) Notice: Subject to any disclaimer, the term of this patent is extended or adjusted under 35 U.S.C. 154(b) by 0 days.

(21) Appl. No.: 09/458,142

(22) Filed: Dec. 9, 1999

(51) Int. Cl.⁷ .................................................. G05B 5/01
(52) U.S. Cl. ..................... 318/624; 318/468; 318/282; 318/280; 318/286; 318/466; 318/461; 318/463
(58) Field of Search ..................................... 318/468, 282, 318/280, 286, 466, 461, 463, 624

(56) References Cited

U.S. PATENT DOCUMENTS 6,118,243 * 9/2000 Reed et al. ........................... 318/468

* cited by examiner

Primary Examiner—Karen Masih
(74) Attorney, Agent, or Firm—Quarles & Brady, LLP; George E. Haas (57) ABSTRACT

A method for controlling non-synchronous actuators using a first and second estimate of the position of the actuator to create a variable position estimate window between which the actual position of the actuator is always bound. The first and second estimates of position are calculated based on the maximum and minimum speeds at which the actuator could be moving in each of first and second directions, and further wherein motion of the actuator in a saturated direction is disabled for as long as the first and second estimates converge at one of two final positions.

9 Claims, 4 Drawing Sheets

FIG. 4 though the actuator is incrementally controlled, the controller may be unable to accurately determine the actual position of the actuator. The controller must determine the actual position of the actuator so that it can disable movement of the actuator if the actuator is saturated. Thus, continual and accurate estimation of the position of the actuator, in anticipation of detecting a saturated condition and acting thereupon, is of paramount importance in controlled operations.

DETECTION OF SATURATION STATUS FOR NON-SYNCHRONOUS INCREMENTAL ACTUATORS USING A VARIABLE POSITION ESTIMATE WINDOW

CROSS-REFERENCE TO RELATED APPLICATIONS

STATEMENT REGARDING FEDERALLY SPONSORED RESEARCH OR DEVELOPMENT

MICROFICHE APPENDIX

BACKGROUND OF THE INVENTION

1. Field of the Invention

The present invention relates to a method for controlling an actuator, and more particularly to a method for detecting the saturation status of non-synchronous incremental actuators using a variable position estimate window.

2. Description of Related Art

An actuator is a mechanical device used to move or control another device. For example, an air conditioning and heating control system may use an actuator to control a damper in an air chamber so that the damper can act as a throttle and control air flow through the chamber.

Due to their relative low cost, the current trend in the actuator industry is to use non-synchronous actuators. Non-synchronous actuators are controlled using three wires—positive, negative, and ground—whereby a controller controlling the actuator can move the actuator in a first or second direction depending upon whether a drive voltage is applied between the positive and ground wires or the negative and ground wires.

Non-synchronous actuators, however, move at different speeds in different directions, due, in part, to different loading on the actuator. Moreover, this speed-disparity is not constant; it can and often does change over time with the actuator's age, fatigue, and other factors. As a result, it is not uncommon for an actuator to move faster in a first direction than it moves in a second direction, or for an actuator, moving in a first direction for a given period of time and then in an opposite second direction for the same period of time, to not return to the same position it was in prior to moving.

As discrepancies accumulate over time, the controller's estimated positions of the actuator quickly become unsynchronized from their actual positions. And after a short period of operation, the controller controlling the actuator may estimate that the actuator is at mid-stroke when the actuator is actually at an ultimate end-stop.

One of the current methods for dealing with speed-disparity is called "overdrive," whereby the controller continues to drive the actuator even if the controller estimates that the actuator is "saturated" (at an end-stop). If the actuator is genuinely saturated, overdriving forces the actuator to continue to drive against the end-stop, which results in heat build-up, thereby shortening the effective life of the actuator. If the actuator is not saturated, the overdrive will force the actuator to drive to an end stop, causing unacceptable control disturbances. While the tolerance for overdrive is reasonably high, the amount of overdrive needed to maintain synchronization with current non-synchronous actuators is significant. As a result, present actuators often settle at a partial stroke position when the controller estimates they are fully open or closed.

While control algorithms known in the art estimate the position of the actuator based on its "on" and "off" time and direction, these algorithms assume a constant actuation speed based on a nominal stroke time of the actuator. These algorithms are unsatisfactory for actuators with different stroke times that move at different speeds in different directions.

Furthermore, when a controller controls an actuator incrementally (i.e., moving the actuator by discrete increments in a specified direction relative to the current position of the actuator, as opposed to moving the actuator to an absolute position), the controller remains unable to accurately determine the actual position of the actuator. The controller must determine the actual position of the actuator so that it can disable movement of the actuator if the actuator is saturated. Thus, continual and accurate estimation of the position of the actuator, in anticipation of detecting a saturated condition and acting thereupon, is of paramount importance in controlled operations.

As is evident from the foregoing, a need exists for a method of minimizing the amount of error, time, and overdrive required to accurately detect the saturated condition of a non-synchronous incremental actuator.

SUMMARY OF THE INVENTION

The present inventors have recognized that the aforementioned limitations can be overcome by using first and second estimates of the position of the actuator, where between the actual position is always bound, wherein the first and second estimates are calculated based on the maximum and minimum speeds at which the actuator could be moving in each of first and second directions, and further wherein the controller ceases moving the actuator in a saturated direction once the first and second estimates converge at one of two final positions.

More specifically, the present invention comprises a method for controlling an actuator that is capable of moving in first and second directions at first and second speeds towards first and second positions, respectively. The first and second speeds are the nominal or average speeds at which the actuator travels in the first and second directions, respectively, and these speeds may be different due to the load on the actuator, the age of the actuator, etc. The method of the present invention functions identically if the speeds are, in fact, identical, if the first speed is greater than the second speed, or if the second speed is greater than the first speed.

In a preferred embodiment, the "first position" is at the end-stop for motion of the actuator in the first direction. Likewise, the "second position" is at the end-stop for motion of the actuator in the second direction.

The method of the present invention comprises the step of defining a first maximum speed and a first minimum speed for movement of the actuator in the first direction, whereby the first maximum speed is greater than the first speed and the first minimum speed is less than the first speed. Likewise, a second maximum speed and a second minimum speed are defined for movement of the actuator in the second direction, whereby the second maximum speed is greater than the second speed and the second minimum speed is less than the second speed. Alternatively, in some implementations of the present invention, the maximum and minimum speeds are the same in both the first and second directions.

During operation of the actuator, a plurality of commands are received whereby each command indicates whether to move the actuator in the first or second direction and how far to move the actuator. In response to the command, the actuator then moves in the specified direction for a specified period of time.

In response to each command, a first position estimate is derived wherein when the actuator moves in the first direction, the first position estimate is changed in response to the first maximum speed and the period of time, and when the actuator moves in the second direction, the first position estimate is changed in response to the second minimum speed and the period of time. Likewise, a second position estimate is derived wherein when the actuator moves in the first direction, the second position estimate is changed in response to the first minimum speed and the period of time, and when the actuator moves in the second direction, the second position estimate is changed in response to the second maximum speed and the period of time.

The method of the present invention comprises a next step of disabling further movement of the actuator in the first direction when the second position estimate indicates that the actuator is in the first position. Likewise, further movement of the actuator in the second direction is disabled when the first position estimate indicates that the actuator is in the second position.

As is evident from the foregoing, one object of the present invention is to minimize the amount of time required to accurately detect the saturated condition of a non-synchronous incremental actuator. It is another object of the present invention to accomplish the above objective with a minimal amount of overdrive. It is still yet another object of the present invention to accomplish the above objectives with a minimum amount of disturbance to the system.

The foregoing and other objects, advantages, and aspects of the present invention will become apparent from the following description. In the description, reference is made to the accompanying drawings which form a part hereof, and in which there is shown, by way of illustration, a preferred embodiment of the present invention. Such embodiment does not necessarily represent the full scope of the invention, however, and reference must also be made to the claims herein for properly interpreting the scope of this invention.

DETAILED DESCRIPTION OF THE INVENTION

Figure 1:
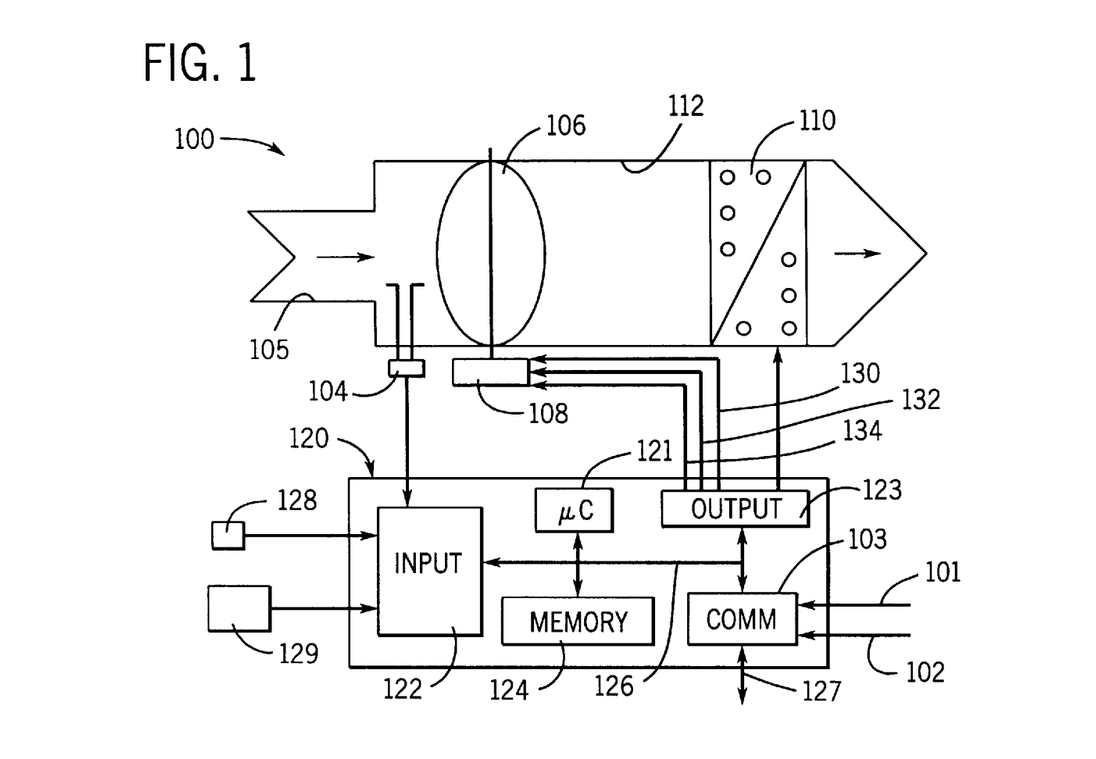
FIG. 1 is a block diagram illustrating a variable-air-volume terminal unit and its controller adapted in accordance with one embodiment of the present invention.

Referring generally to FIG. 1, an exemplary embodiment of the present invention is illustrated, wherein the context of the invention is embodied in an air conditioning and heating control system. While reference is made to this embodiment, it is to be understood that the embodiment is intended as illustrative only, and not by way of limitation.

A variable-air-volume (VAV) terminal unit, or box, 100 is designed to maintain a relatively constant supply air temperature and deliver a variable amount of conditioned air into a controlled region of a building to maintain the region at a desired temperature during its cooling mode of operation. It will, of course, be appreciated that the invention has application to other types of variable-air-volume apparatus. The VAV terminal unit 100 depicted in FIG. 1 is preferably an electro-mechanical device with a digital controller 120. The controller 120 is designed to control the quantity and rate of thermal energy which the VAV terminal unit 100 discharges into the zone to meet the thermal loads of the zone.

Because the VAV terminal unit 100 has distributed digital control, it may operate in a standalone manner or be coupled via a communication network through two ports 101 and 102 of a network interface 103 to a central control system for the entire building. When coupled to a network, the VAV terminal unit 100 communicates using standard objects which reside within the digital controller 120. In this manner, the controller 120 may retain "point" information which may be retrieved and viewed by a user at any user interface on the network.

The VAV terminal unit 100 has an air inlet 105 connected to a duct through which a supply air stream flows from a conventional air handling unit. The supply air has a nominal temperature of approximately 55° F. (13° C.). A damper 106, operated by an actuator 108, acts as a throttle and controls the flow of supply air through the VAV terminal unit 100. For example, the damper 106 may be adjusted to its minimum flow setting for ventilation if cooling is not required, and otherwise opened to a position that supplies the appropriate amount of cooled air into the building zone. When heat is needed, the valve 109 for a heating coil 110 is activated to warm the air flowing through the chamber 112.

The actuator 108 may be connected to the controller 120 by three wires—positive 130, negative 132, and ground 134. By asserting a voltage on the proper wire 130 or 132, the controller 120 causes the actuator 108 to move in a specified direction for a specified period of time. For example, applying a drive voltage between the positive wire 130 and ground wire 134 may cause the actuator 108 to move the damper 106 in a first direction towards a fully open position. Inversely, a drive voltage applied between the negative wire 132 and ground wire 134 may cause the actuator 108 to move the damper 106 towards a fully closed position. By controlling the period of time of assertion of the voltage on the appropriate wire 130 or 132, the controller 120 can move the actuator 108 as desired.

With continuing reference to FIG. 1, the actuator 108 and the heating coil 110 are operated by the VAV controller 120 which includes a microprocessor 121, input circuits 122, output circuits 123, and a memory 124 that are interconnected by signal buses 126. The input circuits 122 interface to input devices, such as parameter sensors, and the output circuits 123 interface to the actuators 108 in the VAV terminal unit 100. For example, one of those input circuits 122 may be connected to a temperature sensor 128 in the zone, while another may receive a differential pressure signal from a conventional flow sensor 104. An additional input can be coupled to a user operable input device 129 that enables temperature and flow rate setpoints and other data to be entered into the controller 120. Separate setpoints for heating and cooling states of operation and for different time periods during the day can be defined. Alternatively such data may be entered from a laptop computer or similar device connected directly to the controller 120 via a serial port 127. The setpoints and other operating parameters may be stored in the memory 124.

The microprocessor 121 may contain a control program stored in an internal read only memory for implementing a conventional control strategy based on the setpoints and inputs from the temperature and air flow sensors. The control program can also implement a software embodiment of the method of this invention, as described below.

The controller 120 can use incremental algorithms whereby the controller 120 moves the actuator 108 in a first or second direction by a position increment relative to the current position of the actuator 108, as opposed to moving the actuator 108 to an absolute position. Such algorithms are well-known for driving specific types of actuators 108 used in conventional VAV terminal units 100.

The actuator 108 in FIG. 1, however, moves in first and second directions at first and second speeds towards fully open and fully closed positions, respectively. The first and second speeds can be the nominal or average speeds at which the actuator 108 travels in the first and second directions, respectively, and these speeds may be different due to the loading on the actuator 108. For example, air flow may exert a greater load on the damper 106 in the closing direction than in the opening direction, or a normally open or closed water valve may have a spring return whereby the actuator 108 is going with the direction of the spring in one direction, and against the spring in the other direction. Furthermore, and by way of illustration and not limitation, it will be assumed throughout this description that the first speed is greater than the second speed; however, the method of the present invention functions identically if the second speed is greater than the first speed or the speeds are identical or nearly so.

In this description, a "first position" is defined as the fully open or extreme position for motion of the actuator 108 in the first direction (i.e., 100% open), whereby the actuator 108 or damper 106 may strike an end stop. When in the first position, the actuator 108 is no longer physically capable of additional motion in the first direction. Likewise, a "second position" is defined as the fully closed or extreme position for motion of the actuator 108 in the second direction (i.e., 0% open), whereby the actuator 108 or damper 106 may strike the same or another end stop. When in the second position, the actuator 108 is no longer physically capable of additional motion in the second direction. The typical actuator 108 has a relatively large number of intermediate positions between these first and second extreme positions.

For example, the damper 106 in FIG. 1 can be fully opened to allow maximum air flow through the chamber 112, or it can be fully closed to allow minimum air flow through the chamber 112. When the actuator 108 is at the end-stop in the first or open direction, it is said to be "saturated" in the first direction, whereby the damper 106 will not open any further in that direction. Likewise, when the actuator 108 is at the other end-stop in the second or closed direction, it is said to be "saturated" in the second direction, whereby the damper 106 will not close any further in that direction. When the actuator 108 is in between the two end stops, it can move in either the first or second direction.

Figure 2:
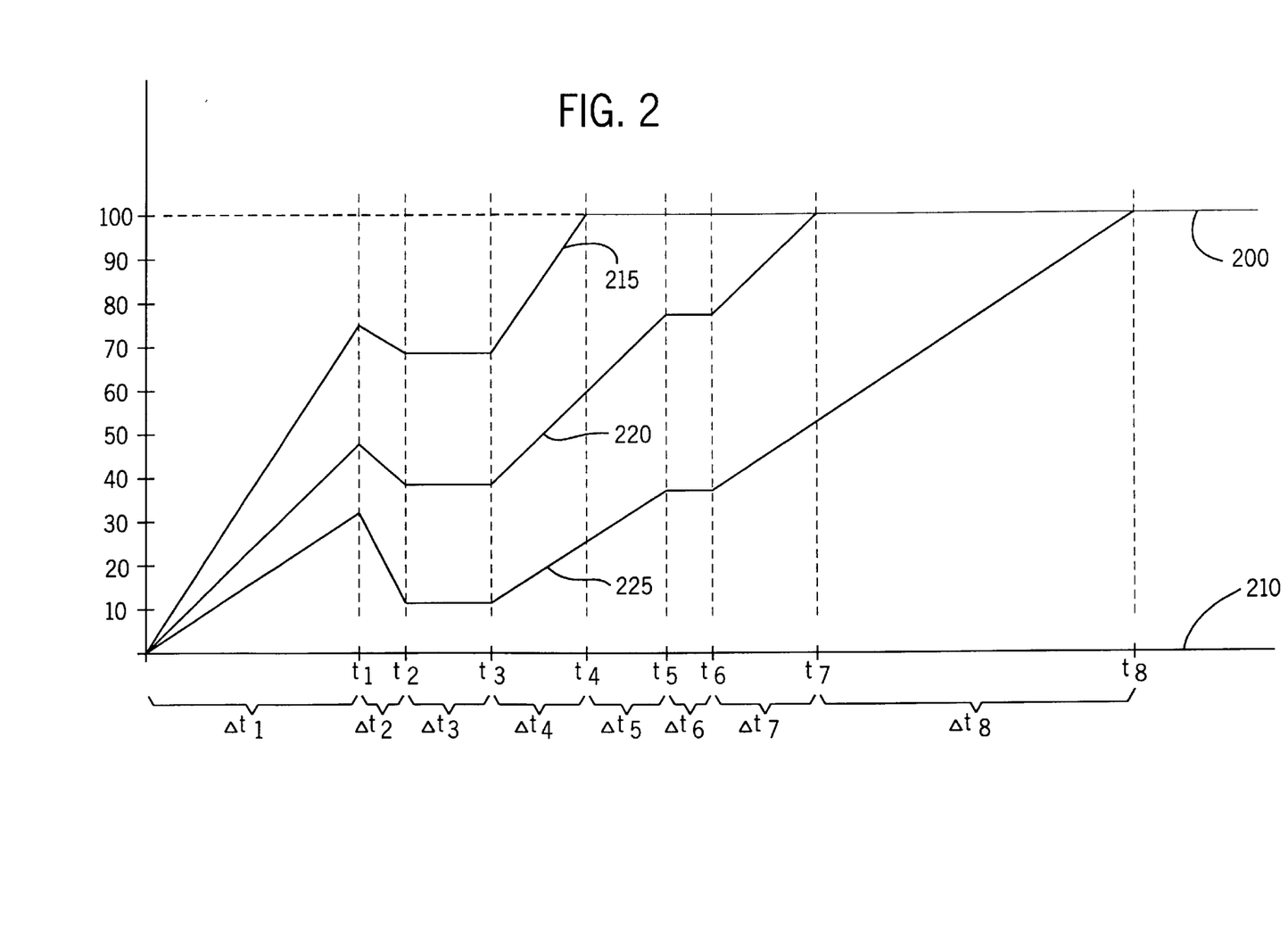
FIG. 2 is a time-graph illustrating motion of an actuator that is bound between dynamic first and second position estimates of a variable position estimate window, whereby further motion of the actuator in the first direction is disabled when the second position estimate indicates that the actuator is in the first position.
Figure 3:
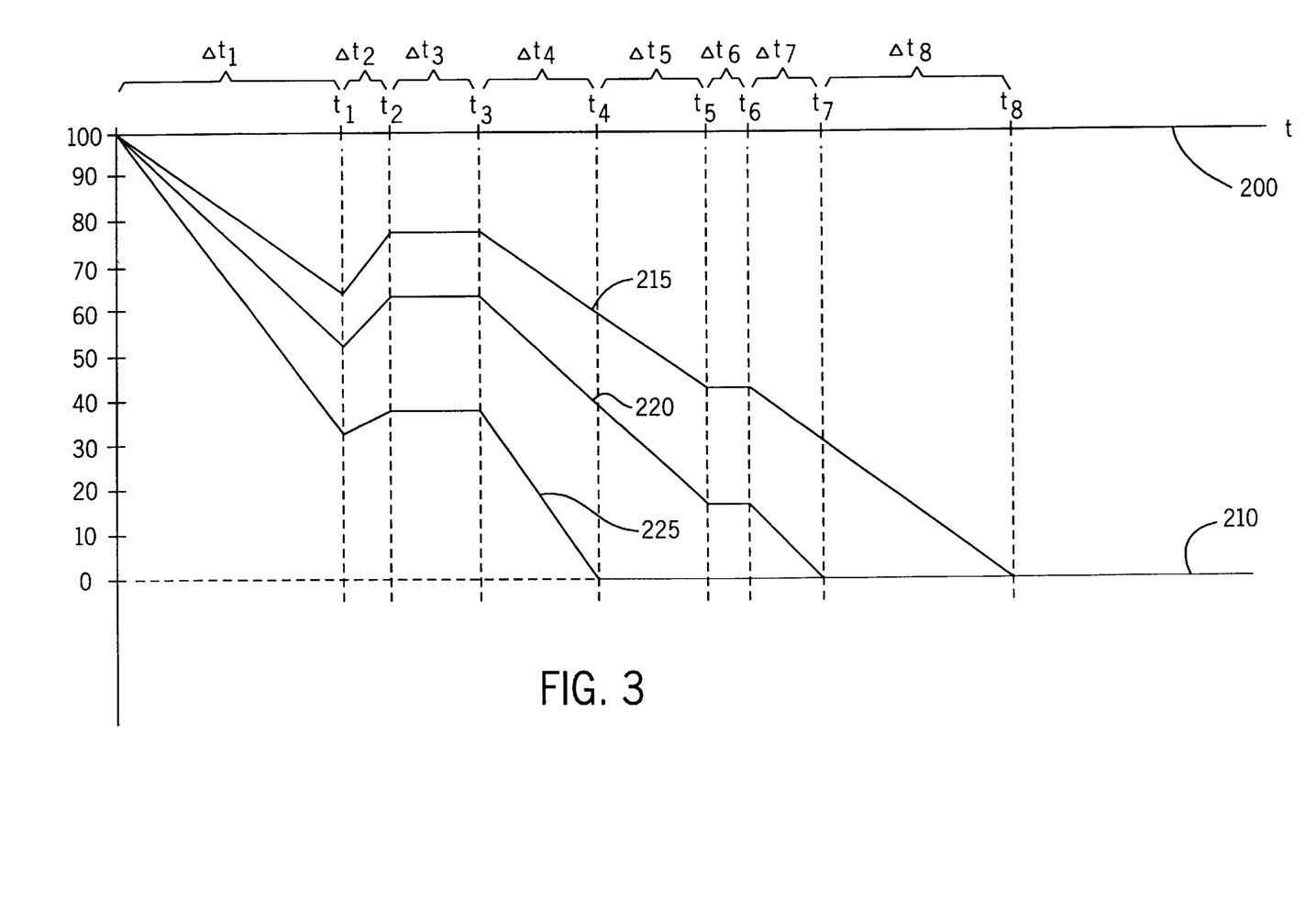
FIG. 3 is a time-graph illustrating motion of an actuator that is bound between dynamic first and second position estimates of a variable position estimate window, whereby further motion of the actuator in the second direction is disabled when the first position estimate indicates that the actuator is in the second position.

Referring now to FIGS. 2 and 3, in which like numbers represent like elements and like features, time is depicted on the horizontal axes and the position of the actuator 108, expressed in terms of the open percentage of the actuator/damper assembly, is depicted on the vertical axes. At the first position 200, the damper 106 is 100% open and further movement in the open, or first, direction is not possible. The actuator 108 is saturated in the first direction when it reaches the first position 200 even though electric current continues to be applied. Likewise, at the second position 210, the damper 106 is 0% open and further movement in the close, or second, direction is not possible. The actuator 108 is saturated in the second direction when it reaches the second position 210 even though electric current continues to be applied.

In FIGS. 2 and 3, movement of the actuator 108 in the first direction towards the first position 200 from fully closed (0%) towards fully open (100%) positions is generally depicted by upward sloping line segments, as will be elaborated upon below. Likewise, actuator 108 movement in the second direction towards the second position 210 from fully open (100%) towards fully closed (0%) positions is generally depicted by downward sloping line segments.

The slope ($\Delta y/\Delta x$) of the various line segments represents the speeds at which the actuator 108 is moving or estimated to be moving, whereby greater slope (i.e., greater magnitude) indicates faster speed and lesser slope (i.e., lesser magnitude) indicates slower speed. Speed can be measured in an arbitrary unit of "percent actuator motion per unit time," and line segments with positive slopes represent actuator 108 movement in the first direction towards the first position 200 whereas line segments with negative slopes represent actuator 108 movement in the second direction towards the second position 210.

Horizontal line segments represent periods of actuator 108 inactivity wherein the actuator 108 is not moving in the first or second direction. These periods of inactivity can be of arbitrary length, including long periods of time ($\Delta t_3$) and short periods of time ($\Delta t_6$), as depicted in the figures. In fact, an actuator 108, presently moving in one direction, can be moved in another direction without any period of inactivity therebetween, as representatively illustrated by the change in directions at $t_1$ without any $\Delta t$ therebetween.

An actual position line 220 represents the actual movement of the actuator 108 in response to each command. It indicates in which direction(s) the actuator 108 has moved and for how long. Actual positioning of the actuator 108 is, of course, unknown, as knowing so would assume unknowable knowledge about the actual speed and position of the actuator 108 at all times. Regardless, this hypothetical actual position line 220 comprises upward and downward sloping line segments that correspond to the actuator 108 moving in the first and second directions, respectively. The upward sloping line segments of the actual position line 220 are drawn with a positive slope that corresponds to the actual (and unknowable) speed of the actuator 108 in the first direction. Thus, the first speed is depicted by the upward sloping line segments of the actual position line 220, all of which are parallel to one another because the first speed is presumed to be constant throughout a reasonable period of operation of the present invention. Similarly, the downward sloping line segments of the actual position line 220 are drawn with a negative slope that corresponds to the actual (and unknowable) speed of the actuator 108 in the second direction. Thus, the second speed is depicted by the downward sloping line segments of the actual position line 220, all of which are parallel to one another because the second speed is presumed to be constant throughout a reasonable period of operation of the present invention. To indicate that the first speed is greater than the second speed, the slope of the upward sloping line segments of the actual position line 220 can be drawn with a greater magnitude than the magnitude of the slope of the downward sloping line segments, although the present invention functions identically if the speeds are the same or nearly the same, or if the second speed is greater than the first speed (and therefore depicted with a greater magnitude of slope).

As explained above, the precise rates of the first and second speeds are not known to the controller 120 due to variations in the speeds according to the load on the actuator 108, as well as the actuator's age, fatigue, bias, and other factors. Thus, the controller 120 can not accurately determine the position of the actuator damper assembly as depicted by the actual position line 220.

As a result of the inability of the controller 120 to accurately determine the position of the actuator damper assembly as depicted by the actual position line 220, the method of the present invention comprises utilizing a first position estimate 215 and a second position estimate 225 where between the actual position of the actuator 108, and actual position line 220, are always bounded. When the actuator 108 moves in the first direction, the first position estimate 215 is changed in response to the first maximum speed and the period of time, and the second position estimate 225 is changed in response to the first minimum speed and the period of time. Likewise, when the actuator 108 moves in the second direction, the first position estimate 215 is changed in response to the second minimum speed and the period of time, and the second position estimate 225 is changed in response to the second maximum speed and the period of time.

The first speed, first maximum speed, and first minimum speed can be derived in response to the minimum stroke time required for the actuator 108 to travel from the second position 210 (0% open) to the first position 200 (100% open) as specified by the manufacturer of the actuator 108. For example, the first maximum speed may be inversely related to the minimum stroke time for movement of the actuator 108 in the first direction and the first minimum speed may be inversely related to the maximum stroke time for movement of the actuator 108 in the first direction, i.e., the first maximum speed=100%/minimum stroke time of the actuator 108 in the first direction, the first minimum speed=100%/ maximum stroke time of the actuator 108 in the first direction, and the first speed (nominal)=the average of the first maximum and first minimum speeds. Likewise, the second speed, second maximum speed, and second minimum speed can be derived in response to the minimum stroke time required for the actuator 108 to travel from the first position 200 (100% open) to the second position 210 (0% open) as specified by the manufacturer of the actuator 108. For example, the second maximum speed may be inversely related to the minimum stroke time for movement of the actuator 108 in the second direction and the second minimum speed may be inversely related to the maximum stroke time for movement of the actuator 108 in the second direction, i.e., the second maximum speed=100%/minimum stroke time of the actuator 108 in the second direction, the second minimum speed=100%/maximum stroke time of the actuator 108 in the second direction, and the second speed (nominal)=the average of the second maximum and second minimum speeds.

As a result, in FIG. 2, for example, the first position estimate 215 begins at the same position (fully closed) as the actual position line 220, but as the actuator 108 moves in the first direction towards the first position 200 over $\Delta t_1$, the first position estimate 215 is changed in response to the first maximum speed. Thus, the first maximum speed is depicted by the upward sloping line segments of the first position estimate 215, all of which are parallel to one another because the first maximum speed is presumed to be constant throughout a reasonable period of operation of the present invention. Because the first maximum speed is, by definition, greater than the first speed, the slope of the upward sloping line segments of the first position estimate 215 are greater (i.e., greater in magnitude) than the slope of the upward sloping line segments of the actual position line 220. By design, the first maximum speed is greater than the first speed, and so the first position estimate 215 moves/ascends at a faster rate than does the actual position line 220.

Similarity, the second position estimate 225 begins at the same position (fully closed) as the actual position line 220, but as the actuator 108 moves in the first direction towards the first position 200 over $\Delta t_1$, the second position estimate 225 is changed in response to the first minimum speed. Thus, the first minimum speed is depicted by the upward sloping line segments of the second position estimate 225, all of which are parallel to one another because the first minimum speed is presumed to be constant throughout a reasonable period of operation of the present invention. Because the first minimum speed is, by definition, less than the first speed, the slope of the upward sloping line segments of the second position estimate 225 are less (i.e., lesser in magnitude) than the slope of the upward sloping line segments of the actual position line 220. By design, the first minimum speed is less than the first speed, and so the second position estimate 225 moves/ascends at a slower rate than does the actual position line 220.

During periods of actuator inactivity, the actual position line 220 of the actuator 108 remains static, as do the first position estimate 215 and the second position estimate 225. Such representative periods are depicted over $\Delta t_3$ and $\Delta t_6$ in FIG. 2.

Because the first maximum speed is greater than the first speed, which is, in turn, greater than the first minimum speed, the first position estimate 215 and second position estimate 225 expansively diverge as the actuator 108 moves in the first direction towards the fully open, first position 200. This is perhaps represented most clearly over $\Delta t_1$ and $\Delta t_4$ in FIG. 2, wherein the first position estimate 215 and second position estimate 225 can be seen to diverge away from the actual position line 220 and consequently away from each other, forming a variable position estimate window within which the actual position line 220 of the actuator 108 is always bound.

Although the actual position of the actuator 108 is bound between the diverging first position estimate 215 and second position estimate 225, this divergence does not continue in perpetuity, as both are bound by the first position 200 when the actuator 108 moves in the first direction, as will be elaborated upon below.

In operation, the first position estimate 215 will indicate that the actuator 108 is in the first position 200 at time $t_4$ before the actuator 108 actually reaches the position as indicated by the actual position line 220. At that time, the second position estimate 225 does not indicate that the actuator 108 is at the first position 200. For example, the first position estimate 215 may indicate that the actuator 108 is in the first position 200 at time $t_4$, whereas the actual position line 220 (representing the actual position of the actuator 108) may not indicate that the actuator 108 is in the first position 200 until a later time $t_7$, and the second position estimate 225 may not indicate that the actuator 108 is in the first position 200 until an even later time $t_8$.

When only the first position estimate 215 indicates that the actuator 108 is in the first position 200, the controller 120 will continue to drive the actuator 108 in the first direction. After time $t_4$ in FIG. 2, the first position estimate 215 remains at the first position 200. When the actuator 108 is moving in the first direction, the first position estimate 215 indicates the worst case scenario in which the actuator 108 could become saturated, and in the intervening interval from $t_4$–$t_7$ until the actual position line 220 indicates that the actuator 108 is actually in the first position 200, no physical overdriving results. The amount of time between when the first position estimate 215 indicates the first position 200 and when the actuator 108 reaches the first position 200 at time $t_7$ depends on the first maximum speed and the amount of original unsynchronization between the first position estimate 215 and the actual position line 220.

In addition, periods of actuator 108 inactivity, as depicted over $\Delta t_6$ in FIG. 2, will not effect the first position estimate 215, which will continue to indicate that the actuator 108 is in the first position 200 until the actuator 108 actually moves in the second direction towards the second position 210.

Physical overdrive in the first direction occurs when the actuator 108 reaches the first position 200, as indicated by the actual position line 220 intersecting the first position 200 (i.e., at $t_7$). Overdrive continues until the second position estimate 225 has a value corresponding to the first position 200, at which time ($t_8$) the controller 120 disables further movement of the actuator 108 in the first direction.

Because the actuator 108 cannot open more than 100%, the first and second position estimates 215, 225 cannot exceed the first position 200. Thus, the amount of time ($\Delta t_8$) until overdrive is terminated, and motion of the actuator 108 in the first direction is subsequently disabled, is minimized. When genuinely saturated, as the actuator 108 is driven into the end-stop or extreme position, the value of the second position estimate 225 soon arrives at the first position 200 (i.e., over $\Delta t_8$), thereby synchronizing the first and second position estimates 215, 225 with each other and with the actual position line 220.

On the other hand, when the actuator 108 moves in the second direction, the first position estimate 215 will be changed in response to the second minimum speed and the period of time, and the second position estimate 225 will be changed in response to the second maximum speed and the period of time, as depicted over $\Delta t_2$ in FIG. 2.

Movement of the actuator 108 in the second, or closing, direction is depicted in FIG. 3 in which at time $t_0$, the actual position line 220, the first position estimate 215, and the second position estimate 225 have all become synchronized and converged at the fully open, first position 200. As the actuator 108 moves in the second direction towards the second position 210 over $\Delta t_1$, the first position estimate 215 is changed in response to the second minimum speed. Thus, the second minimum speed is depicted by the downward sloping line segments of the first position estimate 215, all of which are parallel to one another because the second minimum speed is presumed to be constant throughout a reasonable period of operation of the present invention. Because the second minimum speed is, by definition, less than the second speed, the slope of the downward sloping line segments of the first position estimate 215 are less (i.e., lesser in magnitude) than the slope of the downward sloping line segments of the actual position line 220. By design, the second minimum speed is less than the second speed, and so the first position estimate 215 moves/descends at a slower rate than does the actual position line 220.

Similarly, the second position estimate 225 begins at the same position (fully open) as the actual position line 220, but as the actuator 108 moves in the second direction towards the second position 210 over $\Delta t_1$, the second position estimate 225 is changed in response to the second maximum speed. Thus, the second maximum speed is depicted by the downward sloping line segments of the second position estimate 225, all of which are parallel to one another because the second maximum speed is presumed to be constant throughout a reasonable period of operation of the present invention. Because the second maximum speed is, by definition, greater than the second speed, the slope of the downward sloping line segments of the second position estimate 225 are greater (i.e., greater in magnitude) than the slope of the downward sloping line segments of the actual position line 220. By design, the second maximum speed is greater than the second speed, and so the second position estimate 225 moves/descends at a faster rate than does the actual position line 220.

Because the second maximum speed is greater than the second speed, which is, in turn, greater than the second minimum speed, the first position estimate 215 and second position estimate 225 expansively diverge as the actuator 108 moves in the second direction towards the fully closed, second position 210. The first position estimate 215 and second position estimate 225 diverge in a similar fashion such that the actual position line 220 of the actuator 108 is always bounded in the second direction as well.

Although the actual position of the actuator 108 is bound between the diverging first position estimate 215 and second position estimate 225, this divergence does not continue in perpetuity, as both are bound by the second position 210 when the actuator 108 moves in the second direction, as will be elaborated upon below.

In operation, the second position estimate 225 will indicate that the actuator 108 is in the second position 210 before the actuator 108 has reached that position. See, for example, $t_7$ in FIG. 3, at which time the first position estimate 215 does not indicate that the second position 210 has been reached. The second position estimate 225 may indicate that the actuator 108 is in the second position 210 at time $t_4$, whereas the actual position line 220 (representing the actual position of the actuator 108) may not indicate that the actuator 108 is in the second position 210 until later time $t_7$, and the first position estimate 215 may not indicate that the actuator 108 is in the second position 210 until an even later time $t_8$.

When only the second position estimate 225 indicates that the actuator 108 is in the second position 210, the controller 120 will continue to drive the actuator 108 in the second direction. However, physical overdrive does not occur until the actuator 108 reaches the 0% position and becomes genuinely saturated in the second direction (i.e., at $t_7$). When the actuator 108 is moving in the second direction, the second position estimate 225 indicates the worst case scenario in which the actuator 108 could become saturated, and in the intervening interval from $t_4$–$t_7$ until the actual position line 220 indicates that the actuator 108 is in the second position 210, no physical overdriving results. The amount of time between when the second position estimate 225 indicates that the actuator 108 is in the second position 210 and the actual position line 220 indicates the same depends on the second maximum speed and the amount of original unsynchronization between the second position estimate 225 and the actual position line 220.

Physical overdrive does not occur in the second direction until the actuator 108 is at the second position 210. Overdrive then continues until the first position estimate 215 has a value that corresponds to the second position 210, at which time ($t_8$), the controller 120 disables further movement of the actuator 108 in the second direction.

Because the actuator 108 cannot physically be less than 0% open (e.g., fully closed), the first and second position estimates 215, 225 cannot exceed the second position 210. Thus, the amount of time ($\Delta t_8$) until overdrive is terminated, and motion of the actuator 108 in the second direction is subsequently disabled, is minimized. When genuinely saturated, as the actuator 108 is driven into the end-stop or extreme position, the value of the first position estimate 215 soon arrives at the second position 210 (i.e., over $\Delta t_8$), thereby synchronizing the first and second position estimates 215, 225 with each other and with the actual position line 220.

When the actuator 108 again moves back in the first direction towards the first position 200, operation of the method of the present invention resumes as generally depicted in FIG. 2 and described above. Hence, as the actuator 108 moves back and forth in the first and second directions, the first and second position estimates 215, 225 continue to change as described above, whereby movement of the actuator 108 in the first direction is temporarily disabled when the second position estimate 225 indicates that the actuator 108 is in the first position 200, and whereby movement of the actuator 108 in the second direction is temporarily disabled when the first position estimate 215 indicates that the actuator 108 is in the second position 210.

In a preferred embodiment, the method of the present invention can be implemented entirely in software. Referring now to the representative software embodiment in FIG. 4, a microprocessor 121 begins sequential execution of a stored program at step 300, followed by defining the first maximum speed ($S1_{max}$), the first minimum speed ($S1_{min}$), the second maximum speed ($S2_{max}$), and the second minimum speed ($S2_{min}$) at steps 310 and 320. These speeds can be defined in accordance with user inputs, computed by the software from sensory inputs, or otherwise defined. For example, these speeds can be derived from the maximum and minimum stroke times for the actuator 108 to move between the first and second positions 200, 210, as specified by the manufacturer of the actuator 108.

Figure 4:
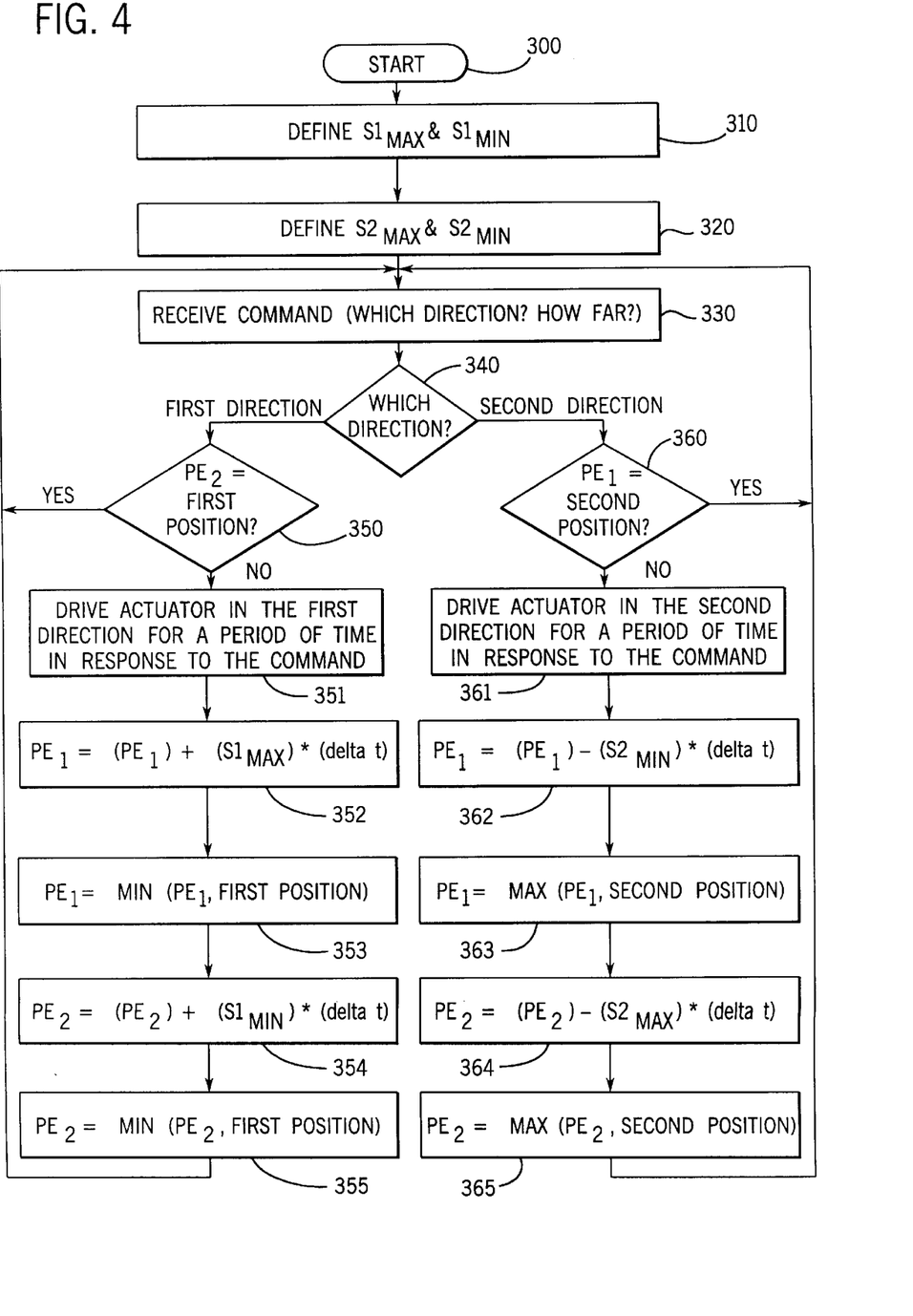
FIG. 4 is a flow-chart illustrating one way in which a software embodiment of the present invention could be implemented.

At step 330, the controller 120 receives a command indicating in which direction the actuator 108 is to move and how far. The controller 120 determines that direction at step 340. For example, consider a command indicating that the actuator 108 is to move in the first direction, whereby program execution branches to step 350 where the second position estimate $PE_2$ is inspected to see if it indicates that the actuator 108 has reached the first position 200 in FIG. 2. If $PE_2$ indicates that the actuator 108 has indeed reached the first position 200, the actuator 108 is saturated in the first direction, and further motion of the actuator 108 in that first direction is disabled by the program execution returning to step 330 to effectively await a command to move in the unsaturated second direction. When the command from process block 330 commands movement in the first direction, it is not necessary to check the first position estimate $PE_1$ as $PE_1$ is only relevant to controlling motion in the second direction, as will be described.

If, on the other hand, $PE_2$ does not indicate that the actuator 108 has reached the first position 200 at step 350, execution advances to step 351, whereby the actuator 108 is driven in the first direction for a specified period of time in response to the command. Next, as depicted at step 352, the value of $PE_1$ is changed in response to $S1_{max}$ and the period of time $\Delta t$. For example, a new first positions estimate $PE_1$ can be calculated by multiplying the first maximum speed $S1_{max}$ by the period of time in which in the actuator 108 was driven, and then adding the result thereof to the old value of $PE_1$. Since the actuator 108 cannot be opened more than 100%, the new $PE_1$ cannot exceed the first position 200, and so the value of $PE_1$ is chosen to be the minimum of the newly calculated value of $PE_1$ and the first position 200, as representatively depicted in step 353.

Next, the value of the second position estimate $PE_2$ is changed at step 354 in response to the first minimum speed $S1_{min}$ in and the period of time. For example, a new second position estimate $PE_2$ can be calculated by multiplying the second minimum speed $S1_{min}$ by the period of time in which in the actuator 108 was driven, and then adding the result thereof to the value of $PE_2$. Since the actuator 108 cannot be opened more than 100%, the new $PE_2$—like the new $PE_1$—cannot exceed the first position 200, and so the value of $PE_2$ is chosen to be the minimum of the newly calculated value and the first position 200, as depicted at step 355. By binding the first position estimate $PE_1$ and the second position estimate $PE_2$ by the first position 200, eventual convergence of the estimates is assured if the actuator 108 continues to move in the first direction. Thus, once the new position estimates are calculated and bound by the first position 200, control returns to step 330 to await another movement command.

If the next command indicates that the actuator 108 is again to be driven in the first direction, control proceeds as described above. However, when a first or next command indicates that the actuator 108 is to move in the second direction, program execution by the controller 120 branches to step 360. Now, the first position estimate $PE_1$ is inspected to see if it indicates that the actuator 108 has already reached the second position 210, as occurs at time $t_8$ in FIG. 3. If the value of the first position estimate $PE_1$ indicates that the actuator 108 has indeed reached the second position 210, the actuator 108 is saturated in the second direction, and further motion of the actuator 108 in that second direction is disabled by the program returning to step 330 to await another command. In addition, when movement is commanded in the second direction, it is not necessary for the software to check the second position estimate $PE_2$ as $PE_2$ is only relevant to disabling motion in the first direction.

Assuming that the first position estimate $PE_1$ at step 360 does not indicate the second position 210, execution advances to step 361, at which the actuator 108 is driven in the second direction for the period of time indicated by the command. Next, at step 362, the value of the first position estimate $PE_1$ is changed in response to the second minimum speed $S2_{min}$ and the period of time. For example, a new value of $PE_1$ is calculated by multiplying $S2_{min}$ by the period of time in which in the actuator 108 was driven, and then subtracting the result thereof from the old value of $PE_1$. Since the actuator 108 cannot be closed to a position less than 0%, the new $PE_1$ cannot be less than the second position 210, and so the value of $PE_1$ is set at step 363 to the maximum of the newly calculated value and the second position 210.

Next, as occurs at step 364, the second position estimate $PE_2$ is changed in response to the second maximum speed $S2_{max}$ and the period of time. For example, a new $PE_2$ can be calculated by multiplying $S2_{max}$ by the period of time in which in the actuator 108 was driven, and then subtracting the result thereof from the old $PE_2$. Since the actuator 108 cannot be closed to a position less than 0%, the new PE$_2$—like the new PE$_1$—cannot be less than the second position 210, and so the new PE$_2$ is chosen to be the maximum of the old PE$_2$ and the second position 210, as depicted by step 365. By binding PE$_1$ and PE$_2$ by the second position 210, eventual convergence of the estimates is assured if the actuator 108 continues to move in the second direction. Thus, once the new position estimates are calculated and bound by the second position 210, control returns to step 330 to await another command, and this control loop repeats itself in various iterations for as long as the software is executed.

Since it is not logically possible for the actuator 108 to be simultaneously saturated in both the first and second directions, it is not possible for PE$_2$ to indicate the first position 200 when moving in the first direction and simultaneously for PE$_1$ to indicate the second position 210 when moving in the second direction. Thus, eventual execution of either steps 351–355 or 361–365 will be possible as soon as the actuator 108 moves in an unsaturated direction.

While the above embodiments expressed position estimates as percentage movements in first or second directions, it is to be understood that other embodiments are also contemplated in which other ways to describe position are utilized, as is understood in the art, and the relationships as described herein between the various speeds need not be linear.

The spirit of the present invention is not limited to any embodiment described above. Rather, the details and features of an exemplary embodiment were disclosed as required. Without departing from the scope of this invention, other modifications will therefore be apparent to those skilled in the art. Thus, it must be understood that the detailed description of the invention and drawings were intended as illustrative only, and not by way of limitation.

To apprise the public of the scope of this invention, the following claims are made:

What is claimed is:

1. A method for controlling an actuator, the actuator capable of motion in first and second directions towards first and second positions, respectively, and capable of moving at a first speed in the first direction and at a second speed in the second direction, the method comprising the steps of:

(a) defining a first maximum speed and a first minimum speed for movement of the actuator in the first direction;

(b) defining a second maximum speed and a second minimum speed for movement of the actuator in the second direction;

(c) receiving a plurality of commands each indicating whether to move the actuator in the first or second direction and how far to move the actuator;

(d) driving the actuator for a period of time in response to each command;

(e) in response to each command, deriving a first position estimate wherein when the actuator moves in the first direction, the first position estimate is changed in response to the first maximum speed and the period of time, and when the actuator moves in the second direction, the first position estimate is changed in response to the second minimum speed and the period of time;

(f) in response to each command, deriving a second position estimate wherein when the actuator moves in the first direction, the second position estimate is changed in response to the first minimum speed and the period of time, and when the actuator moves in the second direction, the second position estimate is changed in response to the second maximum speed and the period of time;

(g) disabling movement of the actuator in the first direction when the second position estimate indicates that the actuator is in the first position; and (h) disabling movement of the actuator in the second direction when the first position estimate indicates that the actuator is in the second position.

2. The method as recited in claim 1 wherein the step of defining a first maximum speed and first minimum speed comprises defining the first maximum speed to be greater than the first speed, and defining the first minimum speed to be less than the first speed.

3. The method as recited in claim 1 wherein the step of defining a second maximum speed and second minimum speed comprises defining the second maximum speed to be greater than the second speed, and defining the second minimum speed to be less than the second speed.

4. The method as recited in claim 1 wherein the step of defining a first maximum speed and first minimum speed is in response to minimum and maximum possible stroke times required for the actuator to travel from the second position to the first position.

5. The method as recited in claim 1 wherein the step of defining a second maximum speed and second minimum speed is in response to minimum and maximum possible stroke times required for the actuator to travel from the first position to the second position.

6. The method as recited in claim 1 wherein the first speed is greater than the second speed.

7. The method as recited in claim 1 wherein the second speed is greater than the first speed.

8. The method as recited in claim 1 wherein the first and second position estimates cannot be greater than the first position.

9. The method as recited in claim 1 wherein the first and second position estimates cannot be less than the second position.

* * * * *